United States Patent [19]

Tanaka

[11] Patent Number: 4,570,214
[45] Date of Patent: Feb. 11, 1986

[54] REACTIVE POWER CONTROL CYCLOCONVERTER

[75] Inventor: Shigeru Tanaka, Tokyo, Japan

[73] Assignee: Tokyo Shibaura Denki Kabushiki Kaisha, Kawasaki, Japan

[21] Appl. No.: 594,917

[22] Filed: Mar. 29, 1984

[51] Int. Cl.⁴ .................... H02M 5/29; G05F 1/70
[52] U.S. Cl. .................... 363/160; 318/729; 323/207
[58] Field of Search ............ 318/800, 729; 323/207; 363/10, 160, 161, 9

[56] References Cited

U.S. PATENT DOCUMENTS

| 4,013,937 | 3/1977 | Pelly et al. ............... 363/10 |
| 4,418,380 | 11/1983 | Tanaka et al. .............. 323/207 |

FOREIGN PATENT DOCUMENTS

| 51-35022 | 3/1976 | Japan . |
| 44381 | 4/1981 | Japan ................. 323/207 |
| 44382 | 4/1981 | Japan ................. 323/207 |
| 56-44382 | 4/1981 | Japan . |
| 136177 | 10/1981 | Japan ................. 363/10 |
| 80266 | 5/1982 | Japan ................. 323/207 |
| 91670 | 6/1982 | Japan ................. 323/207 |
| 6073 | 1/1983 | Japan ................. 363/10 |
| 60328 | 4/1983 | Japan ................. 323/207 |
| 58-621 | 4/1983 | Japan ................. 323/207 |

*Primary Examiner*—William H. Beha, Jr.
*Attorney, Agent, or Firm*—Oblon, Fisher, Spivak, McClelland & Maier

[57] ABSTRACT

A reactive power control cycloconverter for three-phase AC is provided with a reactive power source coupled to power lines of the three-phase AC, a three-phase cycloconverter unit for converting three-phase input power from the power lines into three-phase output power, and a control circuit for controlling the flow of a circulating current according to a detected value of reactive power of the three-phase AC. The cycloconverter includes three power converters which are connected in a delta fashion so that the circulating current for compensating the reactive power of the three-phase AC is allowed to flow in a closed-loop of the delta-connection of the power converters.

10 Claims, 30 Drawing Figures

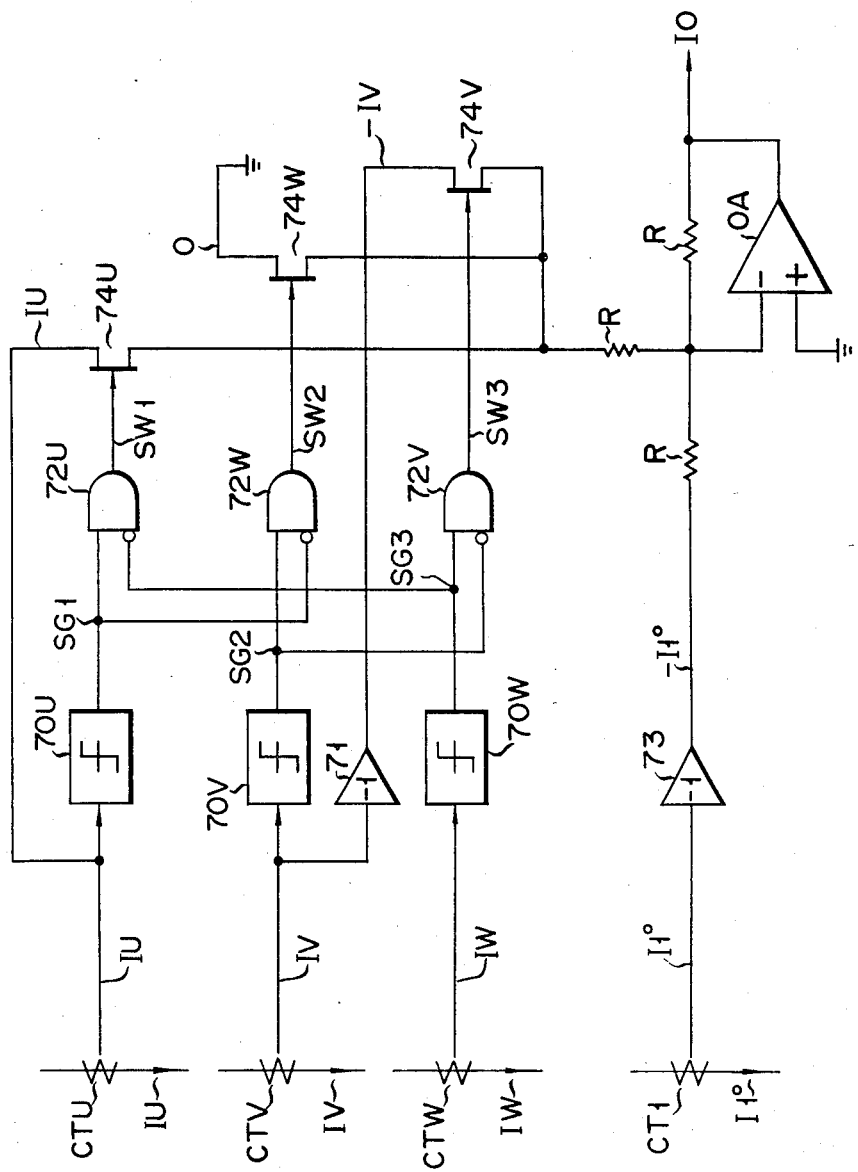
F I G. 7A

F I G. 10
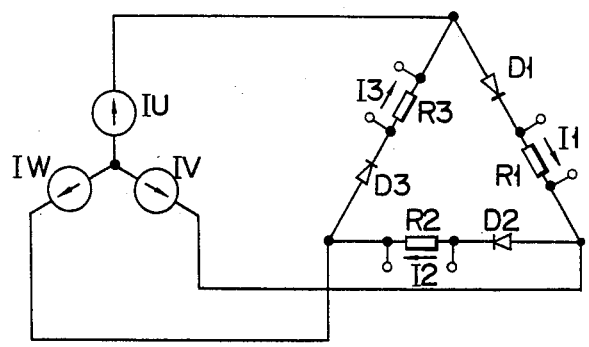
F I G. 11A
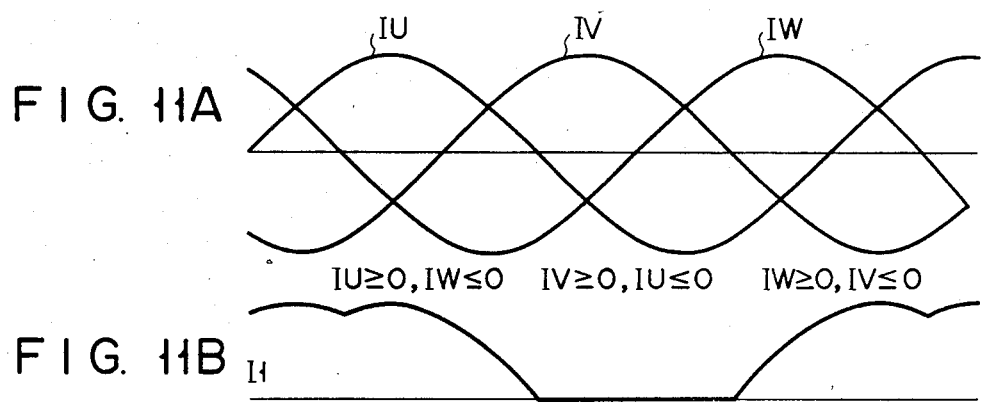
F I G. 11B
F I G. 11C
F I G. 11D

F I G. 13A
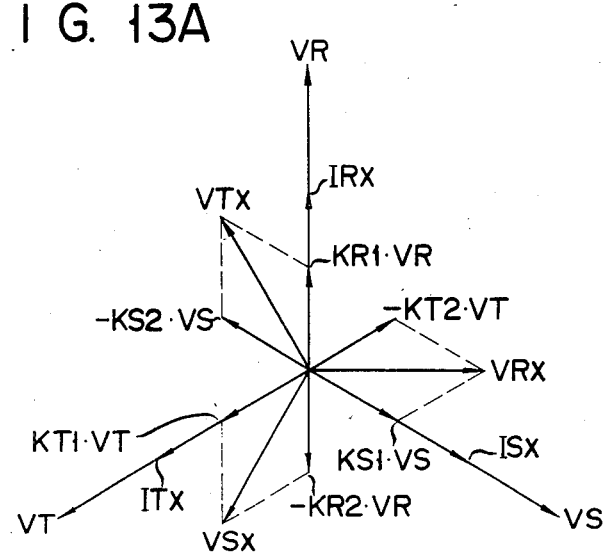
F I G. 16
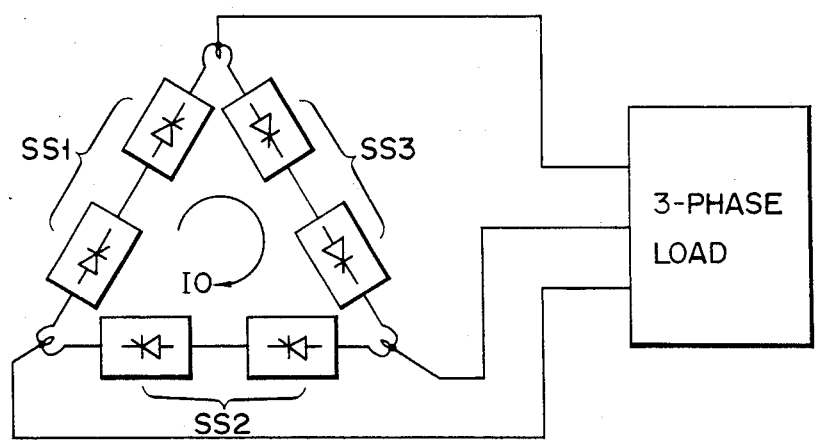

REACTIVE POWER CONTROL CYCLOCONVERTER

BACKGROUND OF THE INVENTION

The present invention relates to a reactive power control cycloconverter which optionally controls, in accordance with specific instructions, the power factor of a fundamental wave at the power supply side.

A cycloconverter of a power supply system directly converts AC power having a given frequency to that having a different frequency. Thyristors used as the components of the cycloconverter are commutated by a power supply voltage, so a prominent amount of reactive power must be supplied from a power supply. Further, the reactive power continuously varies in synchronism with the frequency of a load. From this, in addition to a disadvantage that a large capacity of power supply must be provided, various electrical devices connected to the same power supply system are adversely affected by changes in reactive power.

A reactive power compensator is conventionally coupled to the input side of a cycloconverter in order to compensate for the changes in reactive power at the input side of the cycloconverter. Such a reactive power compensator must have quick response characteristics so as to fully compensate for the changes in reactive power. For this purpose, semiconductor elements such as thyristors are often used, but the use of such elements results in high manufacturing cost.

FIG. 1 shows a reactive power control cycloconverter, which is a background art of the present invention. Reference symbol CC denotes the main unit of a circulating current type cycloconverter; SS-P and SS-N denote positive and negative converters, respectively; LO1 and LO2 respectively denote DC reactors with center taps; and LOAD denotes a load of the cycloconverter. Reference symbol TR denotes a power transformer; C denotes a delta- or Y-connected phase advancing capacitor; and BUS denotes three-phase power lines. A control circuit for the cycloconverter includes a current transformer CTS for detecting three-phase AC currents at the input side of CC, a voltage transformer PT for detecting three-phase AC voltages, a reactive power arithmetic circuit VAR, a control compensator H(S), a current transformer CTP for detecting an output current IP from positive converter SS-P, a current transformer CTN for detecting an output current IN from negative converter SS-N, adders A1 to A5, operational amplifiers K0 to K3, comparators C1 to C3, an absolute value circuit ABS and phase control circuits PH-P and PH-N.

Current IL=(IP−IN) is obtained from adder A3. Current IL represents the detected value of the load current. The following calculation is performed by the combination of adder A1, adder A2, absolute value circuit ABS and amplifier K0=($\frac{1}{2}$):

$$Io = (IP + IN - |IL|)/2 \quad (1)$$

Current Io is a detected value of the circulating current.

The load current control operation of FIG. 1 is as follows.

Specified load current instruction IL* is compared with the detected value IL which indicates the actual load current. Phase control circuits PH-P and PH-N are controlled such that the cycloconverter generates a voltage in proportion to the difference ε3 between currents IL* and IL. Phase control circuit PH-N receives an input from amplifier K2 through inverting amplifier K3, so that the output phase αN of phase control circuit PH-N is set to be 180°−αP, where αP denotes the output phase of phase control circuit PH-P.

The normal operation of FIG. 1 is that the output voltage VP of positive converter SS-P is balanced, at the load side of the cycloconverter, with the output voltage VN of negative converter SS-N, as follows:

$$VP = kv \cdot VS \cdot \cos \alpha P \quad (2)$$
$$\begin{aligned} VN &= -kv \cdot VS \cdot \cos \alpha N \\ &= -kv \cdot VS \cdot \cos(180° - \alpha P) \\ &= +VP \end{aligned} \quad (3)$$

where VS is the power supply voltage and kv is the proportional constant. When load current instruction IL* sinusoidally changes, difference ε3 also changes so that output phases αP and αN are controlled in a specific manner, thereby flowing through the load a sinusoidal current IL. In this normal operation, the output voltage of positive converter SS-P is well-balanced with the output voltage of negative converter SS-N, and no circulating current Io flows.

The operation of the circulating current control is as follows.

Current transformer CTS and voltage transformer PT are arranged at the power supply side (input side of the cycloconverter). Reactive power Q is calculated in reactive power arithmetic circuit VAR. Specified value (specific instruction) Q* for the reactive power is normally set to be zero. Comparator C1 provides difference ε1 (=Q*−Q). Control compensator H(S) includes an integration element for nullifying the steady difference ε1. An output Io* from control compensator H(S) becomes the specified value (specific instruction) of a circulating current Io. Comparator C2 generates difference ε2=(Io*−Io) which is supplied to adders A4 and A5 through amplifier K1.

Inputs ε4 and ε5 respectively supplied to phase control circuits PH-P and PH-N are given, under the assumption that K3=−1, as follows:

$$\epsilon 4 = K2 \cdot \epsilon 3 + K1 \cdot \epsilon 2 \quad (4)$$

$$\epsilon 5 = -K2 \cdot \epsilon 3 + K1 \cdot \epsilon 2 \quad (5)$$

Then, relation αN=180°−αP cannot be maintained any longer, so output voltage VP of positive converter SS-P comes to be unbalanced, by an amount being proportional to K1·ε2, from output voltage VN of negative converter SS-N. The voltage difference [VP−VN] is applied to DC reactors LO1 and LO2, so that circulating current Io flows. When current Io exceeds the specified value (instruction) Io, difference ε2 is reduced so as to decrease the difference [VP−VN]. As a result, current Io is controlled so that Io coincides with Io*.

When reactive power Q is advancing in phase, difference ε1=Q*−Q=−Q becomes positive. Then, specified value Io* is increased, and a phase-delayed reactive current of the cycloconverter increases. The circulating current Io is so controlled that the condition Q=Q*=(0) is finally obtained. When reactive power Q is delayed in phase, inequality ε1<0 is established to decrease the value Io*, so that current Io is controlled to establish the relation Q=0. In this manner, the reactive power at the input side of the cycloconverter becomes zero. In other words, the power factor of a fundamental wave at the power supply side can be held "1".

FIG. 2 shows voltage-current vectors at the input side of the cycloconverter in FIG. 1. Reference numeral Vs denotes the power supply voltage; Icap denotes the current of phase advancing capacitor C; ISSP denotes the input current of positive converter SS-P; ISSN denotes the input current of negative converter SS-N; Icc denotes the input current of the cycloconverter; Ireact denotes the reactive component of input current Icc; and Is denotes the power supply current. This vector diagram illustrates the magnitudes and phase angles of respective signal components relating to the load current at a certain instant, and the load current spontaneously changes. The values of currents ISSP and ISSN and phase angles $\alpha P$ and $\alpha N$ also spontaneously change.

When the reactive power control is performed ($Q^* = 0$), circulating current Io is controlled to establish the relation Icap=Ireact. Reactive current component Ireact is given, under the assumption $\alpha N = 180° - \alpha P$, as follows:

$$\begin{aligned} Ireact &= ISSP \cdot \sin \alpha P + ISSN \cdot \sin \alpha N \\ &= (ISSP + ISSN) \cdot \sin \alpha P \\ &= k1(IP + IN) \cdot \sin \alpha P \\ &= k1(2Io + |IL|) \cdot \sin \alpha P \end{aligned} \quad (6)$$

where k1 is the conversion constant of the cycloconverter. When the operation of control is performed to establish the relation Q=0 or Icap=Ireact, the circulating current Io satisfies the following equation:

$$Io = (Icap - k1 \cdot |IL| \cdot \sin \alpha P)/(2k1 \cdot \sin \alpha P) \quad (7)$$

Even in the background art reactive power control cycloconverter, the fundamental wave power factor at the input side can be fixed at "1" without using an external reactive power compensator. However, in order to control the reactive power, a circulating current is necessary. For this purpose, a pair of positive and negative converters SS-P and SS-N must be provided. Thus, when the background art cycloconverter of this type is employed for a three-phase induction motor or a three-phase synchronous motor, at least six AC-DC power converters must be provided, so that the main control circuit and its related circuit arrangement of the cycloconverter become complex, resulting in high cost and low reliability.

SUMMARY OF THE INVENTION

It is accordingly the object of the present invention to provide a reactive power control cycloconverter which requires a simple configuration for the main control circuit, which requires no external reactive power compensator, and which is capable of eliminating change in reactive power at the input side of the cycloconverter.

To achieve the above object, a reactive power control cycloconverter of this invention includes at least three converters (SS1, SS2, SS3) being connected in delta fashion for a three-phase load (M), and one-loop of a circulating current (Io) flows in the delta-connected converters. Then, a single difference $\epsilon o$ between the one-loop circulating current (Io) of delta-connected converters and its instruction value (Io*) can be commonly used for phase-controlling all of the three converters. From this, the configuration of a main control circuit for the converters apparatus, or the total configuration of the cycloconverter, can be made simpler than a case wherein three sets of FIG. 1 configurations are used to constitute a three-phase reactive power control cycloconverter.

BRIEF DESCRIPTION OF THE DRAWINGS

FIG. 7A shows more detailed configuration of the circuit of FIG. 7;

FIG. 10 shows an arrangement for detecting currents I1, I2 and I3;

FIGS. 11A to 11D show waveforms of detected load currents IU, IV and IW and of currents I1, I2 and I3 flowing through resistors R1, R2 and R3 in FIG. 10;

FIG. 13A illustrates vectors of respective parts in the configuration of FIG. 13;

FIG. 16 shows a modification of the cycloconverter of FIG. 3 or 8, wherein six converters are used to constitute the delta-connected cycloconverter.

DETAILED DESCRIPTION OF THE PREFERRED EMBODIMENT

Figure 3:
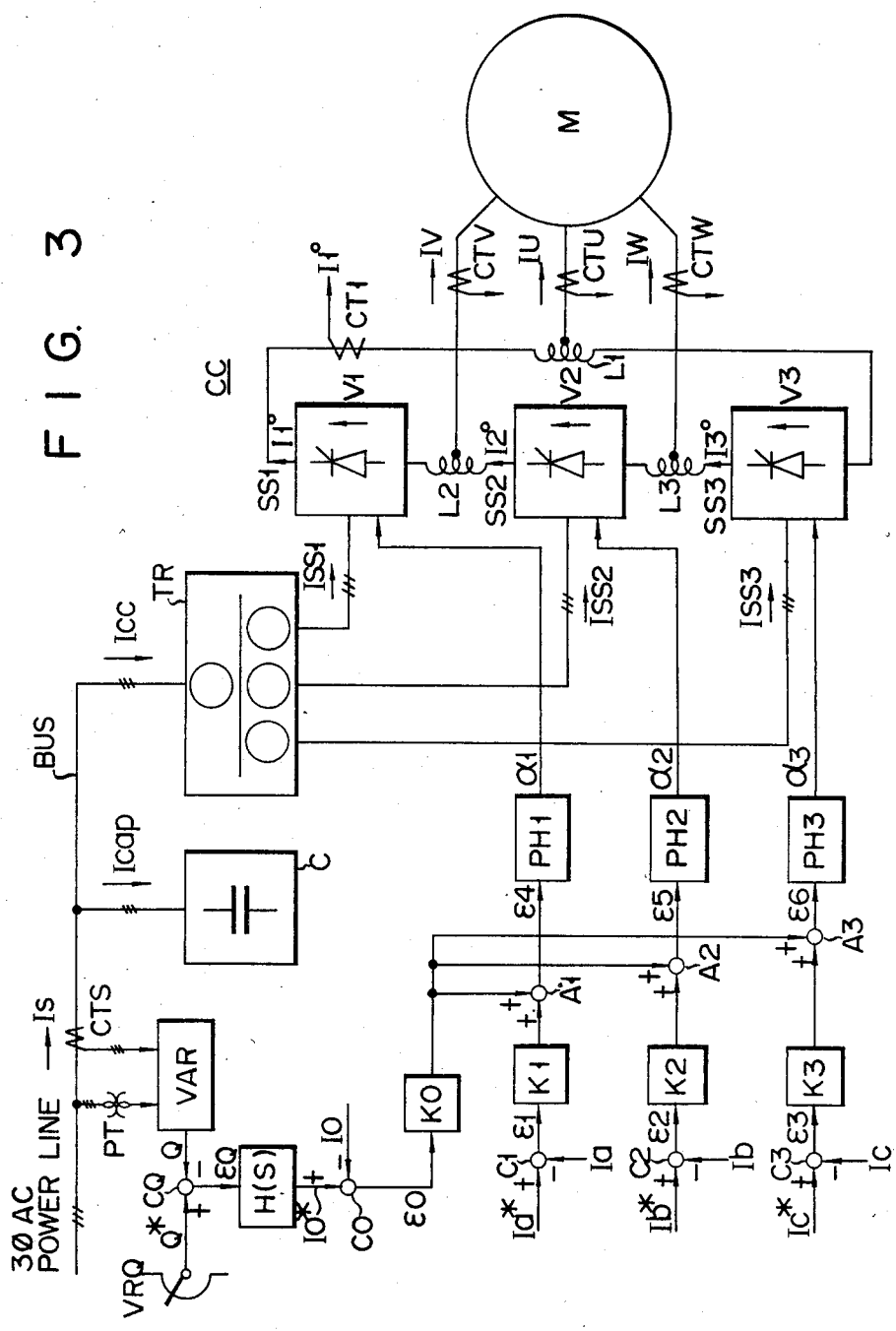
FIG. 3 is a block diagram of a reactive power control cycloconverter according to an embodiment of the present invention.

FIG. 3 is a block diagram of a reactive power control cycloconverter according to an embodiment of the present invention.

Referring to FIG. 3, reference symbol BUS denotes power lines of a three-phase AC power supply; C denotes a delta- or Y-connected phase advancing capacitor; TR denotes a power transformer; CC denotes a three-phase-output cycloconverter main unit; and M denotes a three-phase AC motor (load). Cycloconverter main unit CC includes three AC-DC power converters SS1, SS2 and SS3, and DC reactors L1, L2 and L3 with center taps. The AC input terminals of power converters SS1, SS2 and SS3 are insulated from one another by power transformer TR. The DC output terminals of power converters SS1, SS2 and SS3 are delta-connected via the DC reactors L1, L2 and L3, so that a uni-directional circulating current flows in a closed loop formed by the delta connection of power converters SS1, SS2 and SS3. Thus, a delta-connected circulating current type cycloconverter is obtained. The center taps of the DC reactors L1, L2 and L3 are connected to the three-phase windings of three-phase AC motor M.

A control circuit for the above circulating current type cycloconverter includes a current transformer CTS for detecting three-phase AC currents at the input side of the cycloconverter; a voltage transformer PT for detecting the three-phase AC voltage; a reactive power arithmetic circuit VAR; a control compensator H(S) containing an integration or integration/proportion element; a reactive power setting potentiometer VRQ; comparators CQ, C0, C1, C2 and C3; adders A1, A2 and A3; operational amplifiers K0, K1, K2 and K3; phase control circuits PH1, PH2 and PH3; a current transformer CT1 for detecting the actual output current I1° (containing the information of circurating current Io) from power converter SS1; and load current transformers CTU, CTV and CTW.

Output voltages V1, V2 and V3 of power converters SS1, SS2 and SS3 can be set to be positive or negative. Output currents I1, I2 and I3 of power converters SS1, SS2 and SS3 flow only in one direction according to the arrangement of the power converters.

The control operation will be described in the situation where currents IU, IV and IW are supplied to three-phase AC motor M.

Figure 4:
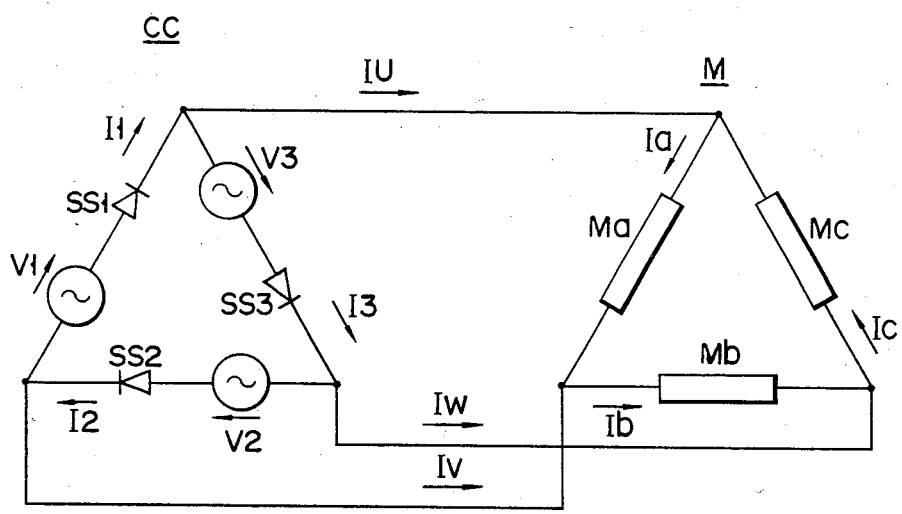
FIG. 4 shows an equivalent circuit of cycloconverter main unit CC and motor M.

FIG. 4 shows an equivalent circuit of the cycloconverter main unit CC and the motor M of FIG. 3. In the equivalent circuit, motor M has windings Ma, Mb and Mc which are connected in delta fashion. Although the motor M is delta-connected, this delta-connection can be equivalently converted to a Y-connection. Phase currents Ia, Ib and Ic flow in the directions illustrated (counterclockwise direction of the closed loop of the delta-connection) and have the following relationships with the line currents IU, IV and IW:

$$Ia = (IU - IV)/3 \tag{8}$$

$$Ib = (IV - IW)/3 \tag{9}$$

$$Ic = (IW - IU)/3 \tag{10}$$

Figure 3A:
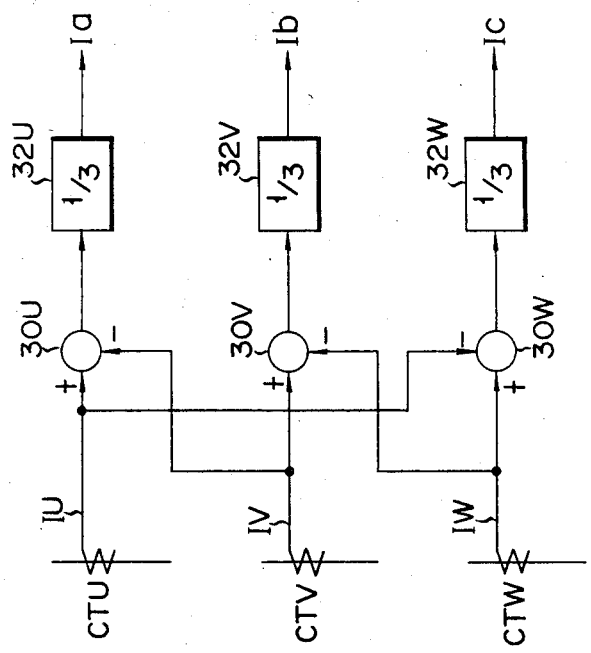
FIG. 3A shows a circuit for detecting phase currents Ia, Ib and Ic of FIG. 4 from three-phase line currents IU, IV and IW.

Currents Ia, Ib and Ic as defined by equations (8) to (10) are obtained by the configuration as shown in FIG. 3A. In FIG. 3A, line currents IU, IV and IW are detected by current transformers CTU, CTV and CTW, respectively. The detected IV is subtracted from the detected IU in a subtractor 30U to provide (IU−IV). The magnitude of (IU−IV) is reduced to ⅓ by an attenuator 32U and Ia of equation (8) is obtained. The detected IW is subtracted from the detected IV in a subtractor 30V to provide (IV−IW). The magnitude of (IV−IW) is reduced to ⅓ by an attenuator 32V and Ib of equation (9) is obtained. The detected IU is subtracted from the detected IW in a subtractor 30W to provide (IW−IU). The magnitude of (IW−IU) is reduced to ⅓ by an attenuator 32W and Ic of equation (10) is obtained.

A set of line currents IU, IV and IW and a set of phase currents Ia, Ib and Ic are generally three-phase sinusoidal currents.

FIGS. 5A to 5D show waveforms of the currents in the equivalent circuit of FIG. 4. Phase currents Ia, Ib and Ic respectively satisfy equations (8), (9) and (10) with respect to line currents IU, IV and IW. Currents I1, I2 and I3 outputted from power converters SS1, SS2 and SS3 will not flow in the negative direction and will change in accordance with values of line currents IU, IV and IW as illustrated. As for the values of output currents I1, I2 and I3, the following three modes may be considered.

Mode (1): IV≦0 and IW≧0

In this mode, output current I2 from power converter SS2 becomes zero, and I1=−IV and I3=IW are obtained.

Mode (2): IW≦0 and IU≧0

In this mode, output current I3 from power converter SS3 becomes zero, and I1=IU and I2=−IW are obtained.

Mode (3): IU≦0 and IV≧0

In this mode, output current I1 from power converter SS1 becomes zero, and I2=IV and I3=−IU are obtained.

It is apparent from the equivalent circuit of FIG. 4, when output voltages from the respective converters SS1, SS2 and SS3 are held in a balanced three-phase state, the following voltage equations are established:

$$V1 = (Ra + Lap) \cdot Ia + Ea \tag{11}$$

$$V2 = (Rb + Lbp) \cdot Ib + Eb \tag{12}$$

$$V3 = (Rc + Lcp) \cdot Ic + Ec \tag{13}$$

where Ra, Rb and Rc are the resistances of windings Ma, Mb and Mc of motor M, respectively; La, Lb and Lc are inductances of windings Ma, Mb and Mc, respectively; Ea, Eb, and Ec are counter electromotive forces from windings Ma, Mb and Mc, respectively; and p is the differentiation operator (=d/dt).

Equations (11) to (13) indicate that output voltage V1 may be used to control phase current Ia. Similarly, output voltages V2 and V3 may be respectively used to control phase currents Ib and Ic.

Referring again to FIG. 3, the control operation of phase currents Ia, Ib and Ic will be described.

Line currents IU, IV and IW are detected by current transformers CTU, CTV and CTW, respectively, and equations (8), (9) and (10) are calculated by the configuration of FIG. 3A to obtain phase currents Ia, Ib and Ic. Currents Ia, Ib and Ic are supplied to comparators C1, C2 and C3 and are compared with specific phase current instructions Ia*, Ib* and Ic*, respectively. Differences $\epsilon1 = Ia^* - Ia$, $\epsilon2 = Ib^* - Ib$, and $\epsilon3 = Ic^* - Ic$ are respectively obtained from comparators C1, C2 and C3, and these differences are amplified by amplifiers K1, K2 and K3, respectively. Amplified signals $\epsilon1 \cdot K1$, $\epsilon2 \cdot K2$ and $\epsilon3 \cdot K3$ from amplifiers K1, K2 and K3 are supplied via adders A1, A2 and A3 to phase control circuits PH1, PH2 and PH3, respectively.

When a relation Ia<Ia* holds, the value $\epsilon1 \cdot K1$ increases, and output voltage V1 from converter SS1 increases. Then, phase current Ia given in equation (11)

increases, and the control operation is effected to finally establish Ia=Ia*. Further, when Ia>Ia* holds, ε1·K1 decreases, and output voltage V1 also decreases. Then, current Ia decreases to establish the relation Ia=Ia*.

Similarly, control is performed to establish relations Ib=Ib* and Ic=Ic*.

Figure 5A:
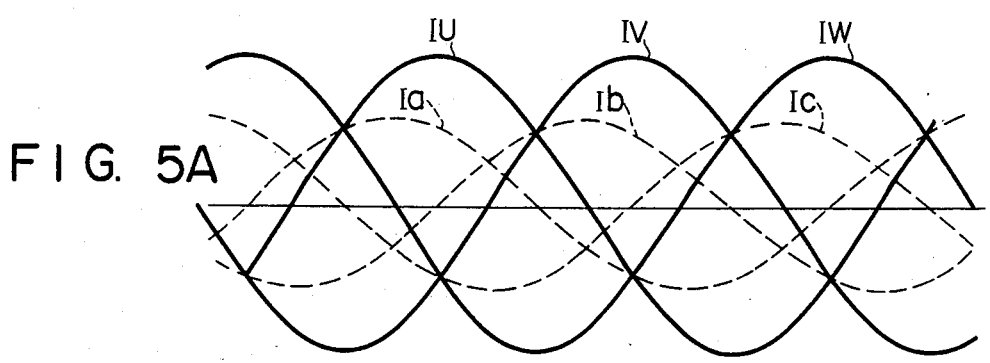
FIGS. 5A to 5D show waveforms of signals in the equivalent circuit of FIG. 4.
Figure 5B:
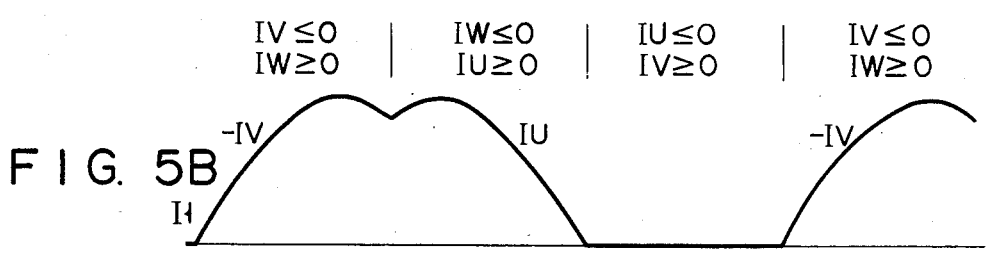
Figure 5C:
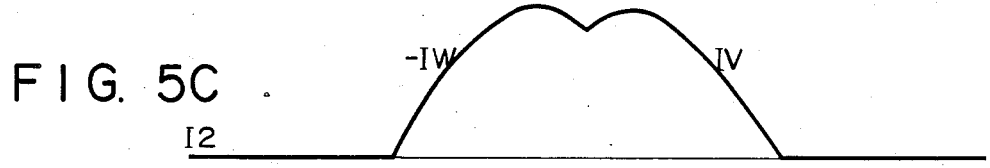
Figure 5D:

When phase currents Ia, Ib and Ic are controlled as three-phase sinusoidal currents as shown by broken lines in FIG. 5A, line currents IU, IV and IW or the input currents of motor M become three-phase balanced sinusoidal currents having waveforms shown by solid lines in FIG. 5A.

The operation of reactive power control at the input side of the cycloconverter shown in FIG. 3 will be described.

Current transformer CTS and voltage transformer PT are arranged at the power supply side of the cycloconverter. Reactive power arithmetic circuit VAR calculates reactive power Q. (Details of circuit VAR will be described later on with reference to FIG. 9.) Specified value (reactive power instruction) Q* of the reactive power is normally set to be zero. Comparator CQ receives Q* and Q and supplies their difference εQ=(Q*−Q) to control compensator H(S). Control compensator H(S) may be formed of an integration or integration/proportion element. The integration element serves to nullify the steady difference εQ. An output Io* from compensator H(S) is used as the specified value (instruction) of circulating current Io. Comparator C0 receives Io* and Io and provides their difference ε0 Io*−Io). Difference ε0 is supplied to adders A1, A2 and A3 via amplifier K0. Then, inputs ε4, ε5 and ε6 for phase control circuits PH1, PH2 and PH3 are given, respectively, as follows:

$$\epsilon 4 = \epsilon 1 \cdot K1 + \epsilon o \cdot K0 \qquad (14)$$

$$\epsilon 5 = \epsilon 2 \cdot K2 + \epsilon o \cdot K0 \qquad (15)$$

$$\epsilon 6 = \epsilon 3 \cdot K3 + \epsilon o \cdot K0 \qquad (16)$$

Each of output voltages V1, V2 and V3 from respective converters SS1, SS2 and SS3 are increased by a DC bias voltage having a value corresponding to εo·K0, so that circulating current Io actually flows through DC reactors L1, L2 and L3.

When circulating current Io exceeds the specified value Io*, difference εo=(Io*−Io) becomes negative, and voltages V1, V2 and V3 are DC-biased in a reverse direction, so that the current Io decreases. Control is performed to finally establish the relation Io=Io*, and the DC bias voltage becomes substantially zero if resistance components of DC reactors L1, L2 and L3 are sufficiently low.

In the steady state wherein Io=Io* is obtained, output voltages V1, V2 and V3 from the respective converters are balanced, so that $$V1 + V2 + V3 = 0 \qquad (17)$$

Firing phase angles α1, α2 and α3 of converters SS1, SS2 and SS3 satisfy the following relation:

$$\cos \alpha 1 + \cos \alpha 2 + \cos \alpha 3 = 0 \qquad (18)$$

When the input currents for the respective converters SS1, SS2 and SS3 are given as ISS1, ISS2 and ISS3, respectively, their active current components Ip1, Ip2 and Ip3, and their reactive current components Iq1, Iq2 and Iq3 are given as:

$$Ip1 = ISS1 \cdot \cos \alpha 1 = k \cdot I1° \cdot \cos \alpha 1 \qquad (19)$$

$$Ip2 = ISS2 \cdot \cos \alpha 2 = k \cdot I2° \cdot \cos \alpha 2 \qquad (20)$$

$$Ip3 = ISS3 \cdot \cos \alpha 3 = k \cdot I3° \cdot \cos \alpha 3 \qquad (21)$$

$$Iq1 = ISS1 \cdot \sin \alpha 1 = k \cdot I1° \cdot \sin \alpha 1 \qquad (22)$$

$$Iq2 = ISS2 \cdot \sin \alpha 2 = k \cdot I2° \cdot \sin \alpha 2 \qquad (23)$$

$$Iq3 = ISS3 \cdot \sin \alpha 3 = k \cdot I3° \cdot \sin \alpha 3 \qquad (24)$$

where k denotes the conversion constant of converters SS1, SS2 and SS3, and I1°, I2° and I3° denote output currents from the respective converters. Currents I1°, I2° and I3° are given as follows:

$$I1° = I1 + Io \qquad (25)$$

$$I2° = I2 + Io \qquad (26)$$

$$I3° = I3 + Io \qquad (27)$$

Active component IPo and reactive component IQo of the total input current Icc of the cycloconverter are given as:

$$\begin{aligned} IPo &= Ip1 + Ip2 + Ip3 \\ &= k(I1 \cdot \cos \alpha 1 + I2 \cdot \cos \alpha 2 + I3 \cdot \cos \alpha 3) + \\ &\qquad Io(\cos \alpha 1 + \cos \alpha 2 + \cos \alpha 3)\} \\ &= k(I1 \cdot \cos \alpha 1 + I2 \cdot \cos \alpha 2 + I3 \cdot \cos \alpha 3) \end{aligned} \qquad (28)$$

and $$\begin{aligned} IQo &= Iq1 + Iq2 + Iq3 \\ &= k\{I1 \cdot \sin \alpha 1 + I2 \cdot \sin \alpha 2 + I3 \cdot \sin \alpha 3) + \\ &\qquad Io(\sin \alpha 1 + \sin \alpha 2 + \sin \alpha 3\} \end{aligned} \qquad (29)$$

Thus, circulating current Io can flow independently of the active component IPo, thereby allowing only reactive component IQo to increase.

Circulating current Io is controlled such that phase-delayed reactive current IQo of the cycloconverter is just balanced with phase-advancing reactive current Icap of phase advancing capacitor C, so that the fundamental wave power factor at the input side of the cycloconverter becomes "1".

When specified value Q* is smaller than the detected value Q of reactive power at the input side of the cycloconverter, difference εQ=(Q*−Q) becomes positive, so that specified value Io* of the circulating current Io obtained from control compensator H(S) increases. From this, IQo of equation (29) increases, and value Q also increases. Finally, the relation Q=Q* is stably established. However, if Q>Q*, inequality εQ<0 is given and Io* decreases. In the same manner as described above, control is performed to establish the relation Q=Q*. When specified value Q* is set to be zero, Q=0 is given so that the fundamental wave power factor at the input side of the cycloconverter is controlled to be "1".

FIGS. 6A to 6E jointly show a timing chart wherein circulating current Io flows in the apparatus of FIG. 3. Reference symbol I1° denotes output current from converter SS1; SG1, SG2 and SG3 respectively denote signals representing the positive or negative states of line currents IU, IV and IW; and SW1, SW2 and SW3 denote operation mode signals corresponding to signals SG1, SG2 and SG3.

Figure 7B:
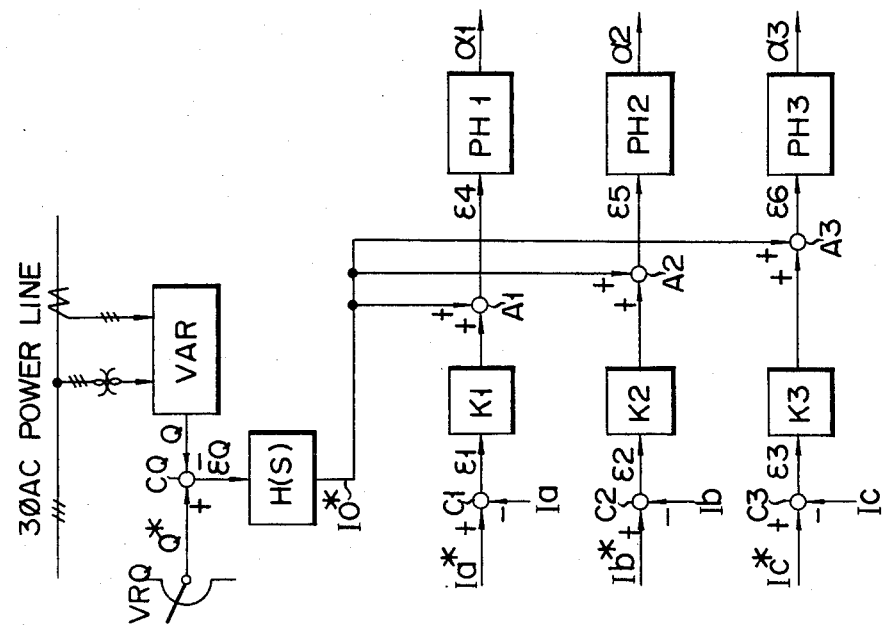
FIG. 7B shows a partial modification of the configuration of FIG. 3.
Figure 7:
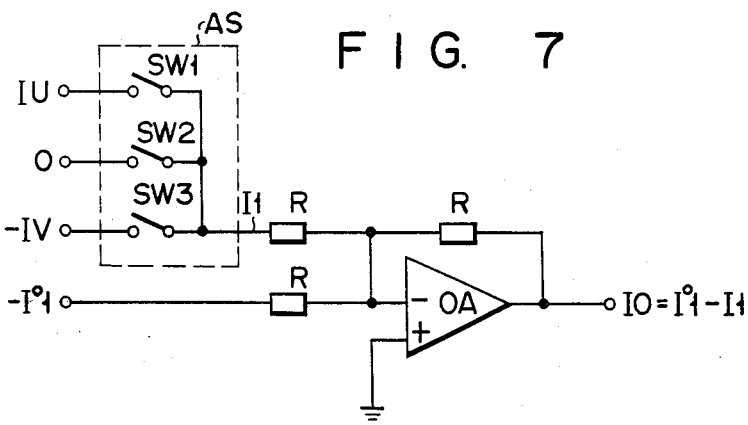
FIG. 7 shows a circuit configuration for detecting circulating current Io.

FIG. 7 shows a circuit configuration for detecting circulating current Io. An inverting operational amplifier OA being provided with resistors R at its NF branch has a gain of −1. Analog switch AS includes three switches SW1, SW2 and SW3 which are turned on and off in response to operation mode signals SW1, SW2 and SW3 of FIG. 6E.

Figure 6A:
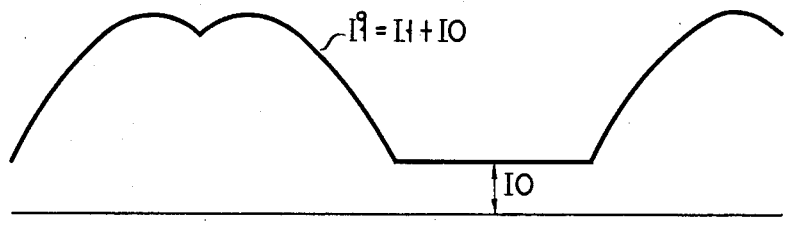
FIGS. 6A to 6E are a timing chart wherein Io indicates a circulating current flowing in the apparatus of FIG. 3.

In FIG. 6A, output current I1° from converter SS1 is a sum of circulating current Io and output current I1 which is defined by line currents IU and IV. As described previously with reference to FIGS. 5A to 5D, current I1 has the following three modes:

(1) $I1 = IU$ for $IW \leq 0$ and $IU \geq 0$ (2) $I1 = 0$ for $IU \leq 0$ and $IV \geq 0$ (3) $I1 = -IV$ for $IV \leq 0$ and $IW \geq 0$ When signals SG1, SG2 and SG3 indicate the states that $IU \geq 0$, $IV \geq 0$ and $IW \geq 0$, respectively, the following logic operation can be performed to obtain the operation mode signals SW1, SW2 and SW3 as follows:

(1) signal $SW1 = SG1 \cdot SG3$     (29A)

(2) signal $SW2 = SG2 \cdot SG1$     (29B)

(3) signal $SW3 = SG3 \cdot SG2$     (29C)

When the detected value of line current IU, the value of zero volt and the inverted detected value of line current IV are respectively supplied to switches SW1, SW2 and SW3 of analog switch AS of FIG. 7; switches SW1, SW2 and SW3 can be turned on and off in accordance with operation mode signals SW1, SW2 and SW3, and output current I1 from converter SS1 can be detected when no circulating current Io flows. When I1 is detected, this current I1 is subtracted from actual output current I1° produced from converter SS1, thereby obtaining circulating current Io (i.e., Io = I1° − I1).

The detected circulating current Io is directly controlled in a minor loop of the reactive power control system as described with reference to FIG. 3. However, the above detection of circulating current Io may be omitted. In this case, circulating current Io may be indirectly controlled. More specifically, comparator C0 and operational amplifier K0 in FIG. 3 are omitted and, as shown in FIG. 7B, output signal Io* from control compensator H(S) is directly supplied to adders A1, A2 and A3 (in this case, the value of Io* is not the specified value of circulating current Io). If $Q > Q^*$, current $Io^* = (\epsilon Q \cdot H(S))$ is increased, and input signals applied to phase control circuits PH1, PH2 and PH3 are:

$$\epsilon 4 = \epsilon 1 \cdot K1 + \epsilon Q \cdot H(S) \quad (30)$$

$$\epsilon 5 = \epsilon 2 \cdot K2 + \epsilon Q \cdot H(S) \quad (31)$$

$$\epsilon 6 = \epsilon 3 \cdot K3 + \epsilon Q \cdot H(S) \quad (32)$$

Output voltages from the respective converters SS1, SS2 and SS3 increase by $\epsilon Q \cdot H(S)$ in the same potential direction, so that circulating current Io increases. As a result, the phase-delayed reactive power increases, so that control is performed to establish the relation $Q = Q^*$. If $Q < Q^*$, current $Io^* = (\epsilon Q \cdot H(S))$ is decreased, and current Io is decreased. Then, control is performed to also establish the relation $Q = Q^*$ in the same manner as described above. In this case, the detected value of circulating current Io cannot be actually measured. However, when control is performed to establish the relation $Q = Q^* = 0$, $IQo = Icap$ may be substituted in equation (29) so that circulating current Io, which satisfies the follow equation, flows:

$$Io = \{(Icap/k) - (I1 \cdot \sin \alpha 1 + I2 \cdot \sin \alpha 2 + I3 \cdot \sin \alpha 3)\} / (\sin \alpha 1 + \sin \alpha 2 + \sin \alpha 3) \quad (33)$$

In other words, circulating current Io is indirectly controlled.

Figure 1:
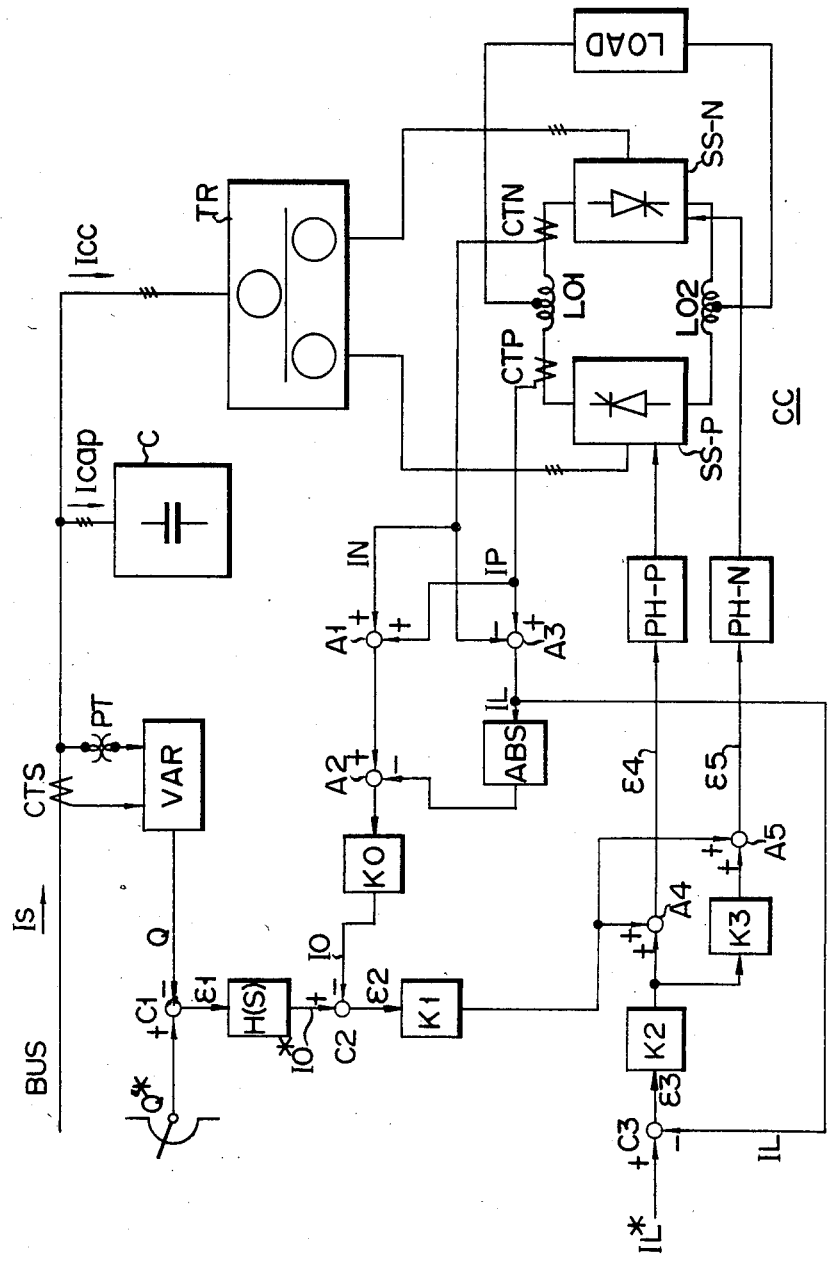
FIG. 1 is a block diagram of a reactive power control cycloconverter, which shows a background art of the present invention.
Figure 2:
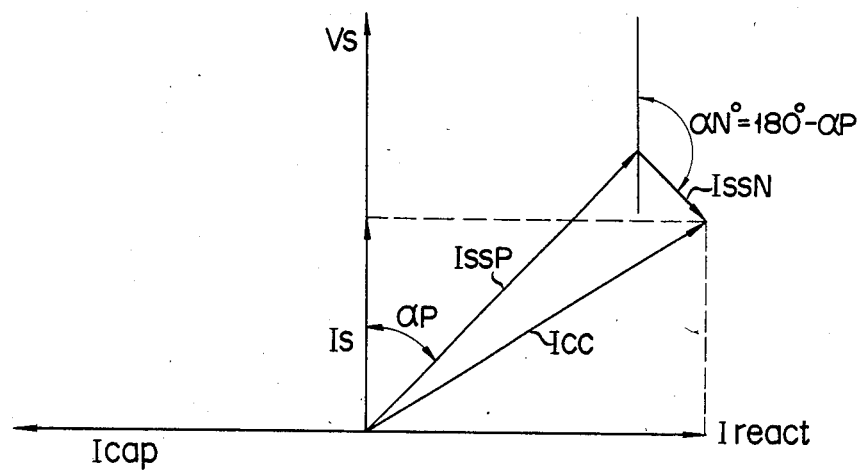
FIG. 2 shows voltage-current vectors at the input side of the cycloconverter of FIG. 1.

The main circuit configuration of the reactive power control cycloconverter of FIG. 3 is simpler than the case wherein three sets of the configurations of FIG. 1 are used to provide a three-phase reactive power control cycloconverter. In addition, no external reactive power compensator is required in order to eliminate variations in reactive power at the input side of the cycloconverter, unlike a conventional cycloconverter of this type. Furthermore, by incorporating a phase advancing capacitor for receiving a given reactive power, the fundamental wave power factor at the input side of the cycloconverter can be kept at "1".

FIG. 7A shows more detailed configuration of the circuit of FIG. 7. In FIG. 7A, current IU detected by current transformer CTU is supplied to a Schmitt trigger circuit (or zero-cross sensor) 70U, current IV detected by current transformer CTV is supplied to a Schmitt trigger circuit (or zero-cross sensor) 70V and current IW detected by current transformer CTW is supplied to a Schmitt trigger circuit (or zero-cross sensor) 70W. Schmitt trigger circuits 70U, 70V and 70W are used for converting the sinusoidal waveform of IU, IV and IW into a rectangular waveform having sharp rising and falling edges.

Figure 6B:
Figure 6C:
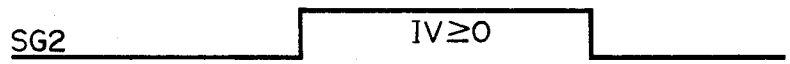
Figure 6D:
Figure 6E:
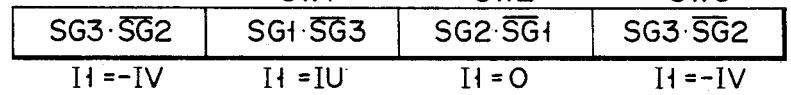

Circuit 70U outputs signal SG1, circuit 70V outputs signal SG2 and circuit 70W outputs signal SG3 (FIGS. 6B, 6C and 6D). Signal SG1 is supplied to the noninverting input of an AND gate 72U and to the inverting input of an AND gate 72W. Signal SG2 is supplied to the noninverting input of AND gate 72W and to the inverting input of an AND gate 72V. Signal SG3 is supplied to the noninverting input of AND gate 72V and to the inverting input of AND gate 72U. Gates 72U, 72W and 72V provides signals SW1, SW2 and SW3 of equations (29A), (29B) and (29C).

Signals SW1, SW2 and SW3 are respectively supplied to the gates of FETs 74U, 74W and 74V. The source (or drain) of FET 74U receives signal IU. The source (or drain) of FET 74W is circuit-grounded. The source (or drain) of FET 74V receives signal −IV which is obtained by phase-inverting the signal IV by a phase inverter 71. The drain (or source) of each of FETs 74U, 74V and 74W is coupled via resistor R to the inverted input of amplifier OA. The inverted input of amplifier OA also receives, via resistor R, a signal −I1° which is obtained by phase-inverting the signal I1° by a phase inverter 73. Current I1° is detected by current transformer CT1. Amplifier OA outputs a signal Io corresponding to the difference between I1° and I1.

Figure 8:
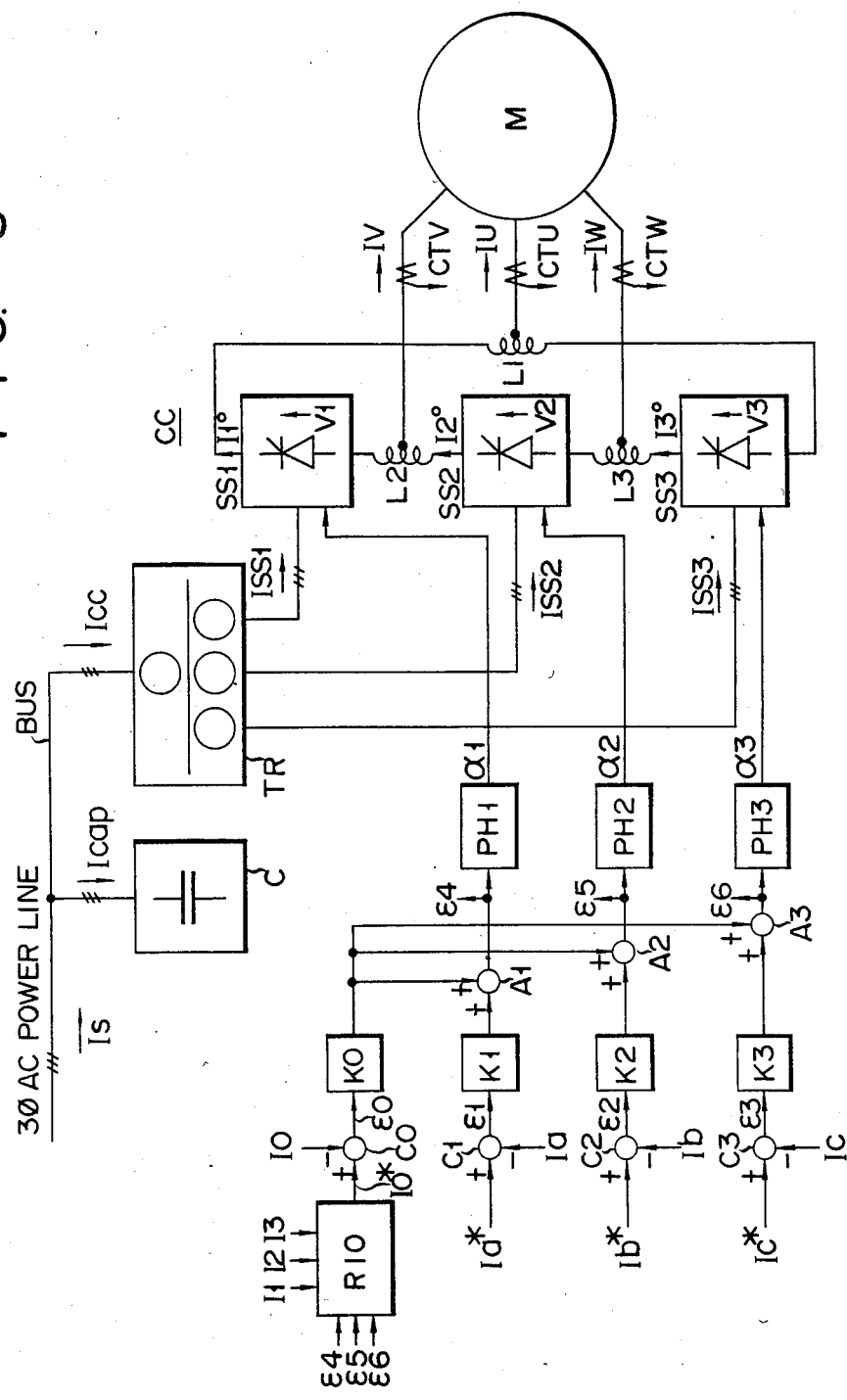
FIG. 8 is a block diagram of a reactive power control cycloconverter according to another embodiment of the present invention.

FIG. 8 is a block diagram of a reactive power control cycloconverter according to another embodiment of the present invention. The same reference symbols as those used in FIG. 8 indicate the same or similar circuit elements in FIG. 3, thereby avoiding redundant explanations.

A control circuit of FIG. 8 includes a circulating current arithmetic circuit RIO; operational amplifiers K0, K1, K2 and K3; phase control circuits PH1, PH2 and PH3; comparators C0, C1, C2 and C3; adders A1, A2 and A3; and load current transformers CTU, CTV and CTW.

The operation of circulating current control in the cycloconverter having the arrangement shown in FIG. 8 will be described.

Specified value (instruction) Io* of the circulating current is generated from the circulating current arithmetic circuit RIO. The Comparator C0 compares the detected value of circulating current Io with the specified value Io*, and generates difference $\epsilon o$ ($=Io^*-Io$) which is supplied through amplifier K0 to adders A1, A2 and A3. Then, input signals $\epsilon 4$, $\epsilon 5$ and $\epsilon 6$ to be supplied to phase control circuits PH1, PH2 and PH3 are obtained in the same manner as in equations (14) to (16).

Output voltages V1, V2 and V3 from respective converters SS1, SS2 and SS3 are increased by a DC bias component corresponding to $\epsilon o \cdot K0$, so that circulating current Io flows through DC reactors L1, L2 and L3.

When circulating current Io exceeds the specified value Io*, difference $\epsilon o$ ($=Io^*-Io$) becomes negative, and voltages V1, V2 and V3 are DC-biased in a reverse direction, so that the current Io decreases. Control is performed to finally reach the result Io=Io*. The DC bias voltage becomes substantially zero and is kept in the steady state (Io=Io*), provided that the resistance components of DC reactors L1, L2 and L3 are sufficiently low.

In a steady state wherein the condition Io=Io* holds, output voltages from converters SS1, SS2 and SS3 are balanced to satisfy the aforementioned equation (17), and firing phase angles $\alpha 1$, $\alpha 2$ and $\alpha 3$ of these converters satisfy the said equation (18).

When the input currents for converters SS1, SS2 and SS3 are given as ISS1, ISS2 and ISS3, respectively, their active current components Ip1, Ip2 and Ip3, and their reactive current components Iq1, Iq2 and Iq3 are given in the same manner as in equations (19) to (24). Further, output currents I1°, I2° and I3° from converters SS1, SS2 and SS3, each of which output current contains the component of circulating current Io, are given in the same manner as in equations (25) to (27). Active component IPo and reactive component IQo of an input current for the cycloconverter of FIG. 8 are given in the same manner as in equations (28) and (29). Then, circulating current Io can flow without changing the active component IPo, thereby allowing only reactive component IQo to increase.

Circulating current Io is controlled such that phase-delayed reactive current IQo of the cycloconverter is just balanced with phase-advancing reactive current Icap of phase advancing capacitor C, so that the fundamental wave power factor at the input side of the cycloconverter is kept at "1".

Figure 9:
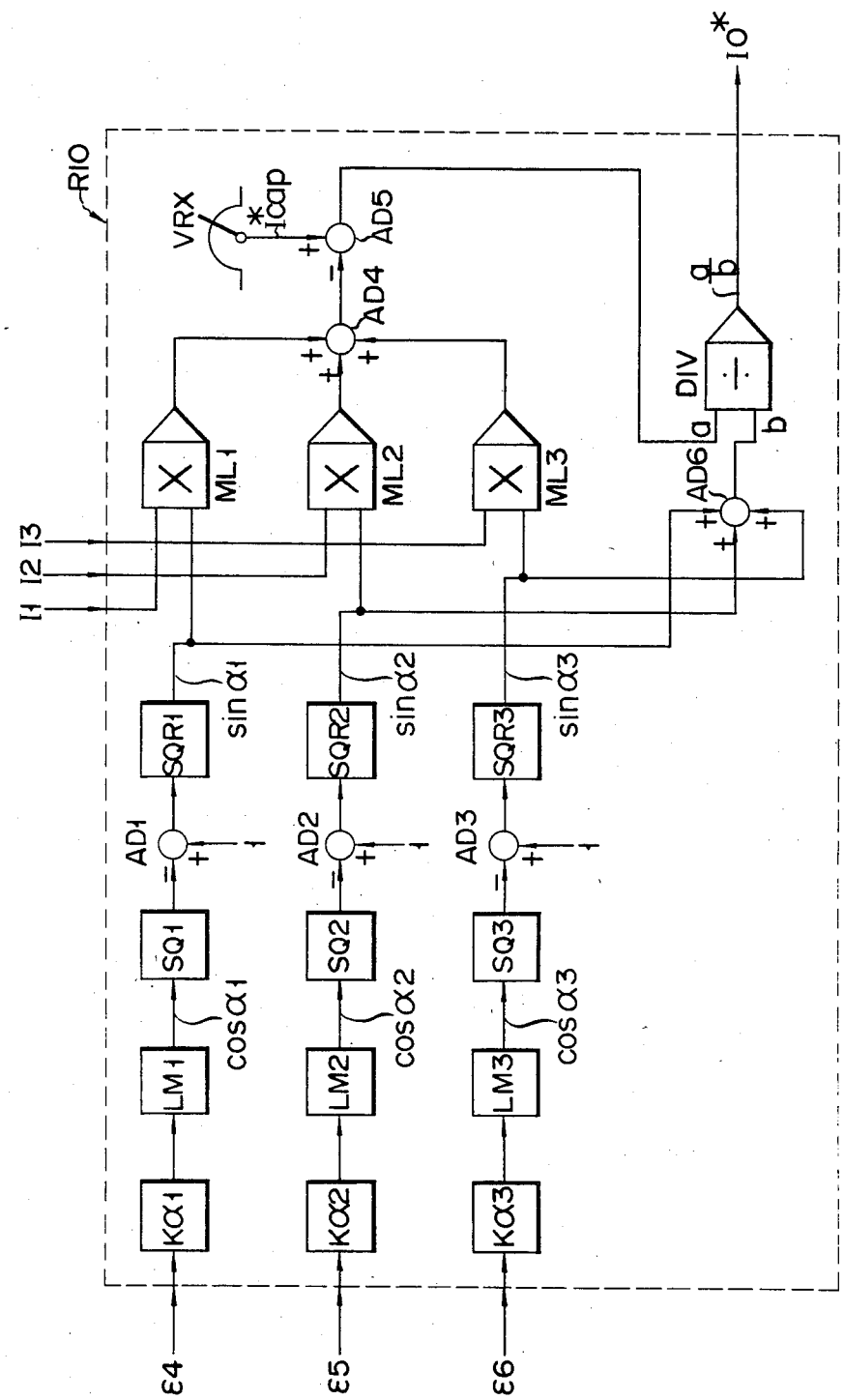
FIG. 9 is a block diagram showing the detailed configuration of circulating current arithmetic circuit RIO in FIG. 8.

FIG. 9 is a block diagram showing the detailed configuration of circulating current arithmetic circuit RIO in FIG. 8. Referring to FIG. 9, reference symbols K$\alpha$1, K$\alpha$2 and K$\alpha$3 denote operational amplifiers; LM1, LM2 and LM3 denote limiter circuits; SQ1, SQ2 and SQ3 denote square circuits; SQR1, SQR2 and SQR3 denote square root circuits; ML1, ML2 and ML3 denote multipliers; DIV denotes a divider; VRX denotes a reactive power setting potentiometer; and AD1 to AD6 denote adders.

Signals $\epsilon 4$, $\epsilon 5$ and $\epsilon 6$ in FIG. 9 are input signals to be supplied to phase control circuits PH1, PH2 and PH3 of FIG. 8. Relations $\epsilon 4 \propto \cos \alpha 1$, $\epsilon 5 \propto \cos \alpha 2$, and $\epsilon 6 \propto \cos \alpha 3$, with firing phase angles $\alpha 1$, $\alpha 2$ and $\alpha 3$, are established here. Operational amplifiers K$\alpha$1, K$\alpha$2 and K$\alpha$3 serve to provide proportion constants in the above proportional relations which are given by the following relations:

$$\cos \alpha 1 = \epsilon 4 \cdot K\alpha 1$$

$$\cos \alpha 2 = \epsilon 5 \cdot K\alpha 2$$

$$\cos \alpha 3 = \epsilon 6 \cdot K\alpha 3$$

Limiter circuits LM1, LM2 and LM3 have upper and lower amplitude limits to satisfy the following inequalities:

$$-1 \leq \cos \alpha 1 \leq +1$$

$$-1 \leq \cos \alpha 2 \leq +1$$

$$-1 \leq \cos \alpha 3 \leq +1$$

The obtained cosine value $\cos \alpha 1$ is squared by square circuit SQ1. A resultant squared value is phase-inverted, and this resultant inverted value is added in adder AD1 to a unit DC voltage 1. A sum from the adder AD1 is supplied to square root circuit SQR1 to obtain sine value (unit voltage signal): $\sin \alpha 1 = \sqrt{1-\cos^2 \alpha 1}$. In the same manner, unit voltage signals $\sin \alpha 2$ and $\sin \alpha 3$ are obtained from $\cos \alpha 2$ and $\cos \alpha 3$, respectively. Other input signals I1, I2 and I3 for circuit RIO are output currents from converters SS1, SS2 and SS3, which are obtained from the detected load current at the time when circulating current Io does not flow.

FIG. 10 shows an arrangement of detectors for detecting the input signals I1, I2 and I3. Reference symbols IU, IV and IW denote detected line currents which may be regarded as current sources. Reference symbols D1, D2 and D3 denote rectifiers; and R1, R2 and R3 denote resistors. Currents I1, I2 and I3 flowing through resistors R1, R2 and R3 are detected as voltage drops of these resistors.

FIGS. 11A to 11D show waveforms of detected load currents IU, IV and IW and of currents I1, I2 and I3 flowing through resistors R1, R2 and R3. The same result as in FIGS. 5A to 5D can be obtained in this case. Output currents I1, I2 and I3 from converters SS1, SS2 and SS3 are detected at the time when no circulating current Io flows.

Return to FIG. 9, the detected current signals I1, I2 and I3 are respectively supplied to multipliers ML1, ML2 and ML3. Signals I1, I2 and I3 are multiplied with $\sin \alpha 1$, $\sin \alpha 2$ and $\sin \alpha 3$, respectively. The resultant products are added together in adder AD4. A sum from adder AD4 is phase-inverted, and the inverted sum is supplied to adder AD5. Adder AD5 also receives signal Icap* obtained from reactive power setting potentiometer VRX. An output a from adder AD5 is given as follows:

$$a = Icap^* - (I1 \cdot \sin \alpha 1 + I2 \cdot \sin \alpha 2 + I3 \cdot \sin \alpha 3)$$

Unit voltage signals $\sin \alpha 1$, $\sin \alpha 2$ and $\sin \alpha 3$ are added in adder AD6. Adder AD6 generates the following sum signal b:

$$b = \sin\alpha 1 + \sin\alpha 2 + \sin\alpha 3$$

These two signals a and b are supplied to divider DIV which performs the division a/b. A quotient is obtained as specified circulating current Io* as follows:

$$Io^* = \{Icap^* - \qquad (34)$$
$$(I1 \cdot \sin\alpha 1 + I2 \cdot \sin\alpha 2 + I3 \cdot \sin\alpha 3)\}/$$
$$(\sin\alpha 1 + \sin\alpha 2 + \sin\alpha 3)$$

When control is performed to coincide the circulating current Io with the specified instruction Io*, reactive component IQo (given by equation (29)) of input current Icc to the cycloconverter can be represented as:

$$IQo = k\{I1 \cdot \sin\alpha 1 + I2 \cdot \sin\alpha 2 + I3 \cdot \sin\alpha 3 + \qquad (35)$$
$$Io^*(\sin\alpha 1 + \sin\alpha 2 + \sin\alpha 3)\}$$
$$= k \cdot Icap^*$$

When the condition Icap*=Icap/k is satisfied, the relation IQo=Icap is established, so that the reactive power at the input side of the cycloconverter can be controlled to be zero, and the fundamental wave power factor can be held at "1".

The detected value of circulating current Io is obtained by detecting the output current I1° from converter SS1 of FIG. 8, and by subtracting the current I1 from the detected current I1°. In other words, from equation (25), Io=I1°−I1.

In the reactive power control cycloconverter of FIG. 8, the fundamental wave power factor at the input side of the cycloconverter can be controlled to be "1" without employing an external reactive power compensator. In addition, the main circuit arrangement of the cycloconverter of the invention is simple as compared with that of the background art cycloconverter. Furthermore, the specified circulating current instruction can be directly obtained from the current supplied to the load and from the firing phases of the converters. In this sense, conventional reactive power detectors at the input side of the cycloconverter can be omitted, and a control error caused by their detection delay can be avoided, thereby obtaining improved reactive power control characteristics with a short response time.

In the above embodiments, currents I1, I2 and I3 are obtained from the detected values of load currents IU, IV and IW and are used for calculations for obtaining circulating current instruction Io*. However, when phase currents Ia, Ib and Ic are controlled to coincide with specified values Ia*, Ib* and Ic*, currents I1, I2 and I3 may be calculated from specified values Ia*, Ib* and Ic*, thereby obtaining a quicker response from the improved reactive power control system.

Figure 12:
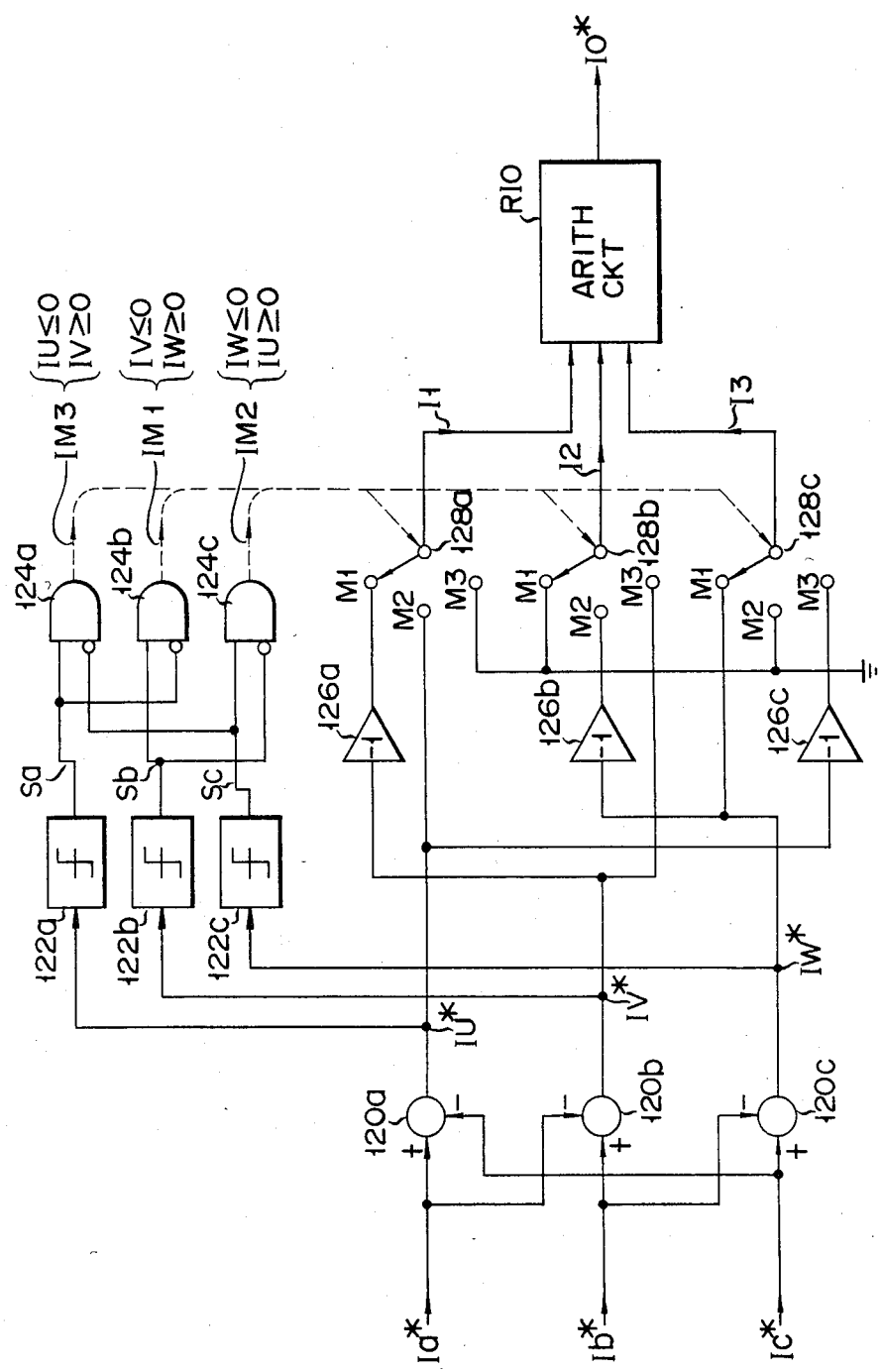
FIG. 12 shows a configuration for generating currents I1, I2 and I3 from instructions Ia*, Ib* and Ic*.

FIG. 12 shows a configuration for generating current signals I1, I2 and I3 from instructions Ia*, Ib* and Ic*. In FIG. 12, Ic* is subtracted from Ia* in a subtractor 120a and subtracter 120a provides IU* corresponding to Ia*−Ic*. Ia* is subtracted from Ib* in a subtractor 120b and subtracter 120b provides IV* corresponding to Ib*−Ia*. Ib* is subtracted from Ic* in a subtracter 120c and subtracter 120c provides IW* corresponding to Ic*−Ib*. IU* is supplied to a Schmitt trigger circuit (or zero-cross sensor) 122a, IV* is supplied to a Schmitt trigger circuit (or zero-cross sensor) 122b and IW* is supplied to a Schmitt trigger circuit (or zero-cross sensor) 122c. Schmitt trigger circuits 122a, 122b and 122c are used for converting the sinusoidal waveform of IU*, IV* and IW* into a rectangular waveform having sharp rising and falling edges.

Circuit 122a outputs a signal Sa, circuit 122b outputs a signal Sb and circuit 122c outputs a signal Sc. Signal Sa is supplied to the noninverting input of an AND gate 124a and to the inverting input of an AND gate 124b. Signal Sb is supplied to the noninverting input of AND gate 124b and to the inverting input of an AND gate 124c. Signal Sc is supplied to the noninverting input of AND gate 124c and to the inverting input of AND gate 124a. Gates 124a, 124b and 124c provides instruction signals IM3, IM1 and IM2, respectively.

Signals IM1, IM2 and IM3 are supplied to three-contact electric switches 128a, 128b and 128c, each of whose switching state is controlled according to the logical states of IM1, IM2 and IM3. The first contact M1 of switch 128a receives −IV* via a phase inverter 126a, the second contact M2 thereof receives IU* and the third contact M3 thereof is circuit-grounded. The first contact M1 of switch 128b is circuit-grounded, the second contact M2 thereof receives −IW* via a phase inverter 126b and the third contact M3 thereof receives IV*. The first contact M1 of switch 128c receives IW*, the second contact M2 thereof is circuit-grounded and the third contact M3 thereof receives −IU via a phase inverter 126c. Switches 128a, 128b and 128c provide I1, I2 and I3, respectively, according to the logical states of IM1, IM2 and IM3. Thus, when IV≦0 and IW≧0, all switches 128a to 128c selects the contact M1. When IW≦0 and IU≧0, all switches 128a to 128c selects the contact M2. When IU≦0 and IV≧0, all switches 128a to 128c selects the contact M3. I1, I2 and I3 thus obtained from switches 128a, 128b and 128c are supplied to arithmetic circuit RI0 having a configuration of FIG. 9.

Figure 13:
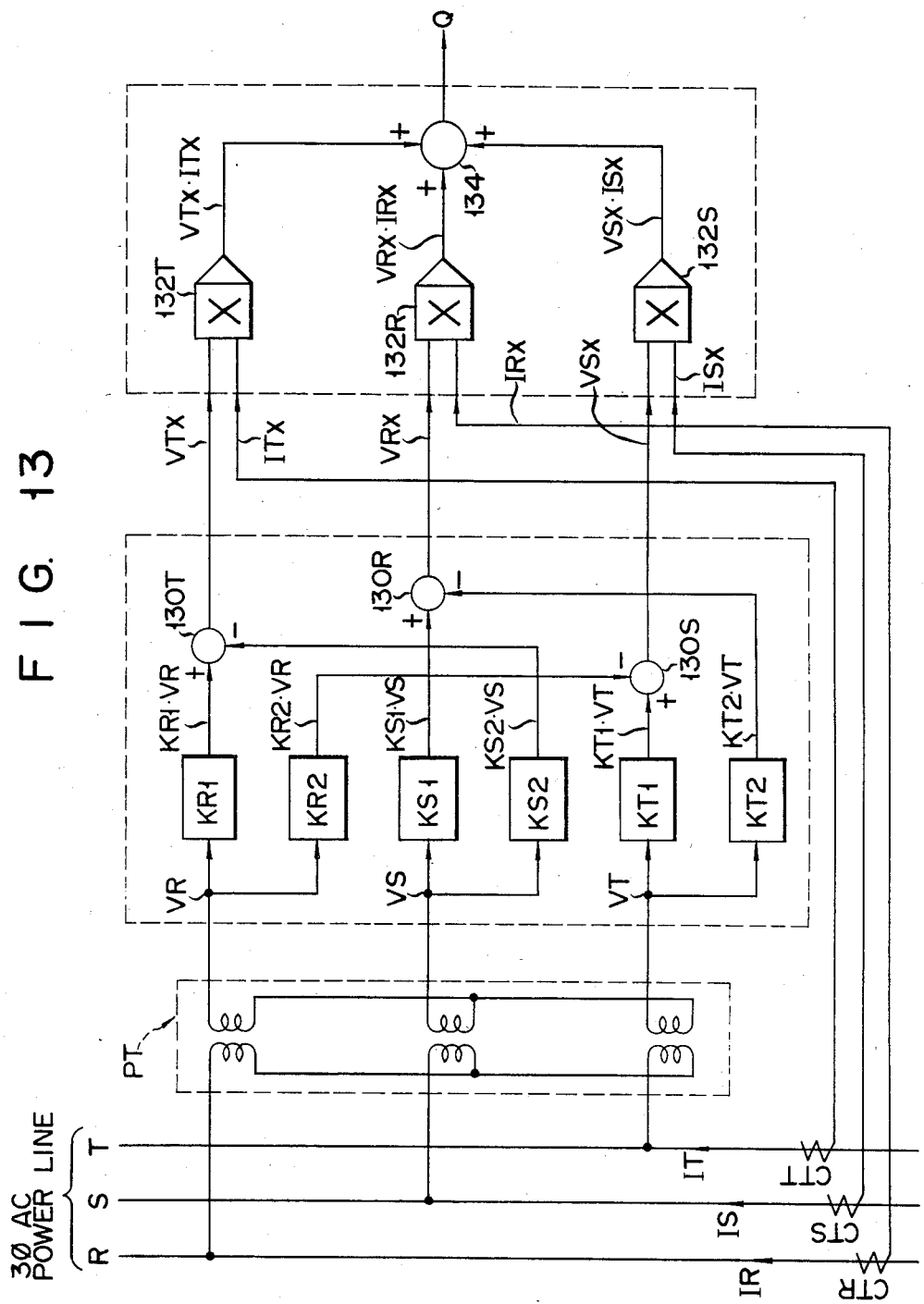
FIG. 13 shows details of circuit VAR in FIG. 3.

FIG. 13 shows details of VAR in FIG. 3, and FIG. 13A illustrates vectors of respective parts in the configuration of FIG. 13. In FIG. 13, line voltages of three-phase AC power lines R, S and T are transformed to voltages VR, VS and VT through a transformer PT. VR is changed to KR1·VR via a coefficient amplifier KR1 and to KR2·VR via a coefficient amplifier KR2. VS is changed to KS1·VS via a coefficient amplifier KS1 and to KS2·VS via a coefficient amplifier KS2. VT is changed to KT1·VT via a coefficient amplifier KT1 and to KT2·VT via a coefficient amplifier KT2. KS2·VS is subtracted from KR1·VR in a subtracter 130T. Subtracter 130T provides a voltage signal VTx having a given amplitude and a phase which is delayed by 90 degrees from VT as shown in FIG. 13A. Subtracter 130R provides a voltage signal VRx having a given amplitude and a phase which is delayed by 90 degrees from VR as shown in FIG. 13A. Subtracter 130S provides a voltage signal VSx having a given amplitude and a phase which is delayed by 90 degrees from VS as shown in FIG. 13A.

Line currents of three-phase AC power lines R, S and T are respectively transformed to current signals IRx, ISx and ITx through current transformers CTR, CTS and CTT. IRx, ISx and ITx are in-phase with VR, VS and VT, respectively, as shown in FIG. 13A. VTx is multiplied by ITx in a multiplier 132T. Multiplier 132T provides a signal VTx·ITx. VRx is multiplied by IRx in a multiplier 132R. Multiplier 132R provides a signal VRx·IRx. VSx is multiplied by ISx in a multiplier 132S. Multiplier 132S provides a signal VSx·ISx. VTx·ITx, VRx·IRx and VSx·ISx are added in an adder 134. Adder 134 provides the signal Q indicating the reactive power at the input side of the cycloconverter.

Figure 14:
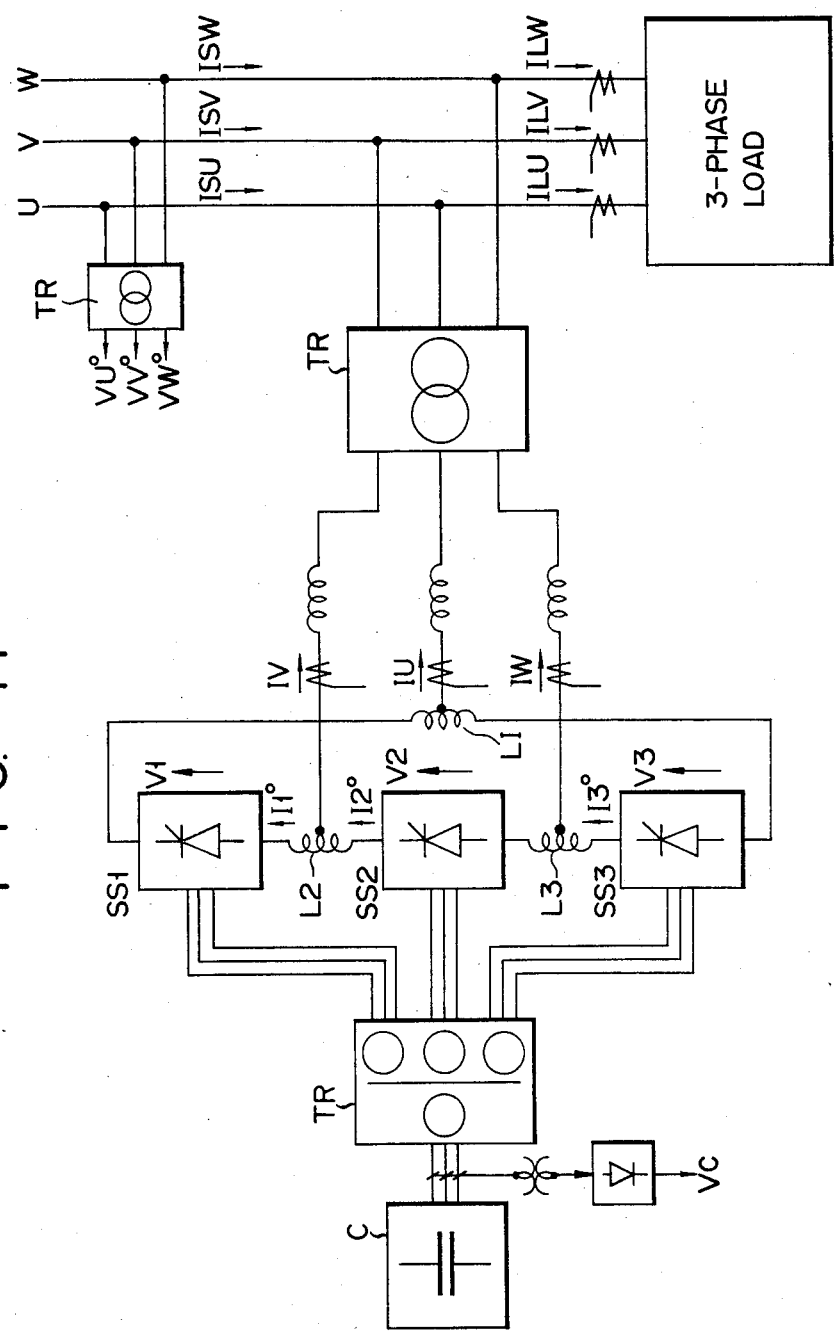
FIGS. 14 and 15 jointly show an application of this invention wherein the output circuit of the cycloconverter of FIG. 3 or 8 is coupled to three-phase power supply lines (U, V, W) and the amount of circulating current (Io) is kept at a fixed value.
Figure 15:
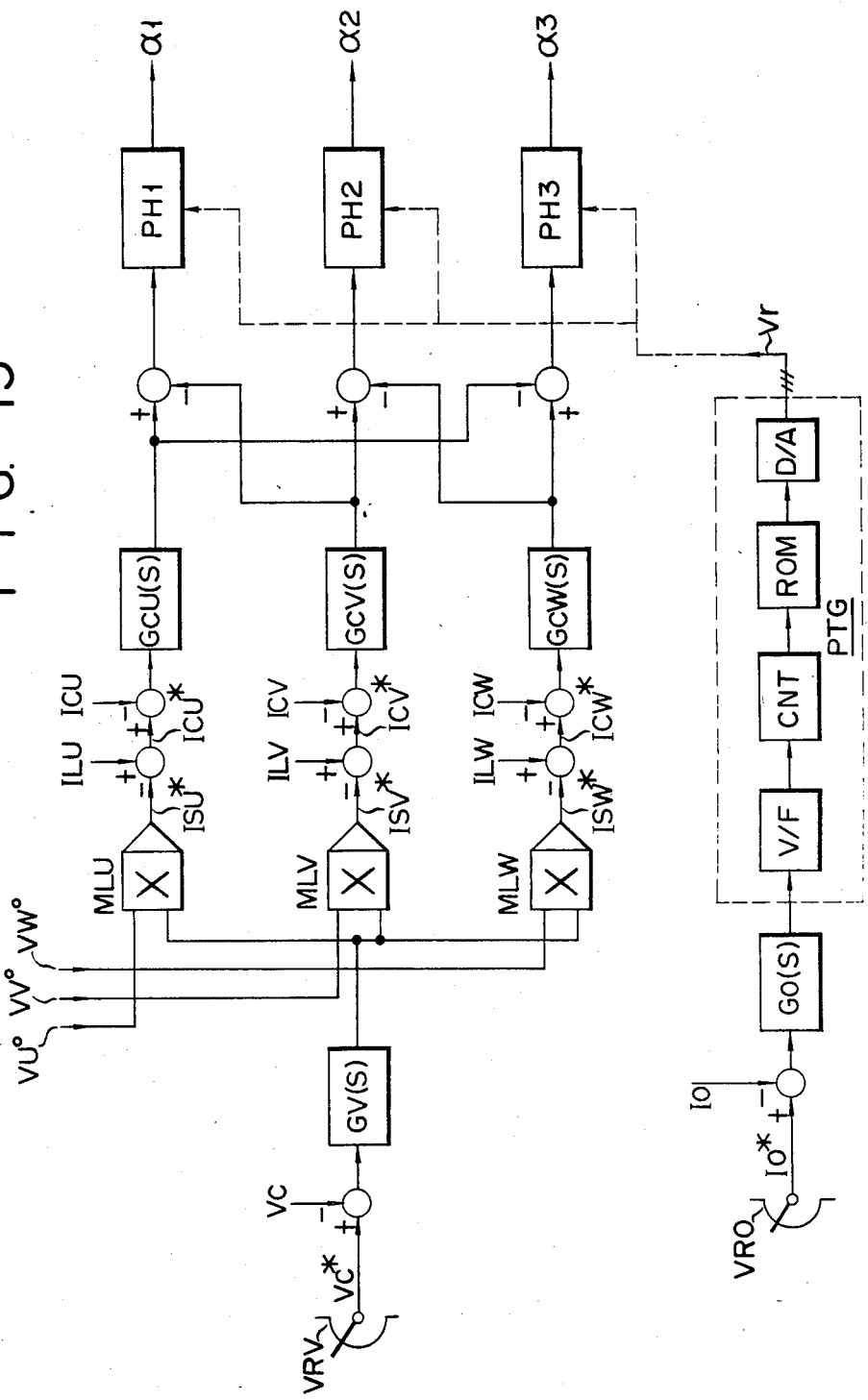

FIGS. 14 and 15 jointly show an application of this invention wherein three-phase power supply lines (U, V, W) are used for the load of the cycloconverter of FIG. 3 or 8 and the amount of circulating current (Io) is kept at a fixed value. The combination of FIGS. 14 and 15 corresponds to the combination of FIGS. 5 and 6 of U.S. patent application Ser. No. 562,213 filed on Dec. 16, 1983, now U.S. Pat. No. 4,529,925, except that, in the present invention, the power converters SS1, SS2 and SS3 are delta-connected and one-loop circulating current Io flows in this delta-connected power converters. One of the inventors of this U.S. application is the same as the inventor of the present invention. All disclosures of this U.S. application are incorporated in the present application.

FIG. 16 shows a modification of the cycloconverters of FIG. 3 or 8, wherein six converters are used to constitute the delta-connected cycloconverter. In the configuration of FIG. 16, although more than three power converters are employed, one-loop circulating current Io is utilized for all six power converters. Each pair of series connected power converters SS1, SS2 and SS3 corresponds to each of power converters SS1, SS2 and SS3 in FIG. 3 or 8.

The description of this specification and the illustration of the appended drawings are not intended to limit the present invention. Various changes, modifications or addition of sub-configurations may be made within the scope of the invention as claimed.

What is claimed is:

1. A reactive power control cycloconverter for three-phase AC, comprising:
   a reactive power source coupled to a power line of the three-phase AC;
   cycloconverter means coupled to said power line, for converting three-phase input power from said power line to three-phase output power, said cycloconverter means including at least three power converters which are connected in a delta fashion so that a circulating current for compensating the reactive power of said three-phase AC is allowed to flow in a closed-loop of the delta-connection of said power converters; and
   control means coupled to said power converters, for controlling the flow of said circulating current according to the reactive power of said three-phase AC.

2. A cycloconverter according to claim 1, further comprising:
   detector means coupled to an output circuit of said cycloconverter means and to said control means, for detecting from currents flowing through said output circuit a circulating current signal representing said circulating current, said circulating current signal being used for controlling the flow of said circulating current.

3. A cycloconverter according to claim 1, wherein said control means includes:
   voltage converter means coupled to said power line, for converting three line voltages to a first voltage signal, a second voltage signal and a third voltage signal, each of said first to third voltage signals being phase-deviated by substantially 90 degrees from the corrensponding line voltages;
   current converter means coupled to said power line, for converting three line currents flowing through said power line to a first current signal, a second current signal and a third current signal, each of said first to third current signals being substantially in-phase with the corrensponding line voltages;
   multiplier means coupled to said voltage converter means and current converter means, for multiplying said first voltage signal by said first current signal to provide a first multiplied signal, for multiplying said second voltage signal by said second current signal to provide a second multiplied signal and for multiplying said third voltage signal by said third current signal to provide a third multiplied signal; and
   mixer means coupled to said multiplier means, for mixing said first to third multiplied signals to provide a reactive power control signal, said reactive power signal being used for the control of said circulating current such that the reactive power at said power line is minimized or cancelled.

4. A cycloconverter according to claim 2, wherein said control means includes:
   voltage converter means coupled to said power line, for converting three line voltages to a first voltage signal, a second voltage signal and a third voltage signal, each of said first to third voltage signals being phase-deviated by substantially 90 degrees from the corrensponding line voltages;
   current converter means coupled to said power line, for converting three line currents flowing through said power line to a first current signal, a second current signal and a third current signal, each of said first to third current signals being substantially in-phase with the corrensponding line voltages;
   multiplier means coupled to said voltage converter means and current converter means, for multiplying said first voltage signal by said first current signal to provide a first multiplied signal, for multiplying said second voltage signal by said second current signal to provide a second multiplied signal and for multiplying said third voltage signal by said third current signal to provide a third multiplied signal; and
   mixer means coupled to said multiplier means, for mixing said first to third multiplied signals to provide a reactive power control signal, said reactive power signal being used for the control of said circulating current such that the reactive power at said power line is minimized or cancelled.

5. A cycloconverter according to claim 2, wherein said control means includes:
   phase current detector means coupled to three-phase output lines of said cycloconverter means, for detecting a first phase current signal corresponding to currents flowing through first and second ones of said three-phase output lines, detecting a second phase current signal corresponding to currents flowing through second and third ones of said three-phase output lines and detecting a third phase current signal corresponding to currents flowing through third and first ones of said three-phase output lines.

6. A cycloconverter according to claim 5, wherein said control means includes:
   control signal generator means coupled to said phase current detector means and being responsive to a first phase current instruction, a second phase current instruction and a third phase current instruction, for generating a first phase control signal corresponding to the difference between said first phase current instruction and said first phase current signal, generating a second phase control signal corresponding to the difference between said second phase current instruction and said second phase current signal, and generating a third phase control signal corresponding to the difference between said third phase current instruction and said third phase current signal, said first, second and third phase control signals being used for controlling the actuation of said three power converters.

7. A cycloconverter according to claim 6, wherein said control means includes:
circulating current generator means coupled to said detector means and said control signal generator means and being responsive to a circulating current instruction, for generating a circulating current control signal corresponding to the difference between said circulating current instruction and said circulating current signal, and supplying said circulating current control signal to said control signal generator means so that said first to third phase control signals contain information of said circulating current control signal which serves to control said reactive power.

8. A cycloconverter according to claim 6, wherein said control means includes:
circulating current instruction means coupled to said power line and said control signal generator means, for generating a circulating current instruction according to line voltages and line currents of said power line, and supplying said circulating current instruction to said control signal generator means so that said first to third phase control signals contain information of said circulating current instruction which serves to control said reactive power.

9. A cycloconverter according to claim 7, wherein said control means further includes:
voltage converter means coupled to said power line, for converting three line voltages to a first voltage signal, a second voltage signal and a third voltage signal, each of said first to third voltage signals being phase-deviated by substantially 90 degrees from the corresponding line voltages;
current converter means coupled to said power line, for converting three line currents flowing through said power line to a first current signal, a second current signal and a third current signal, each of said first to third current signals being substantially in-phase with the corrensponding line voltages;
multiplier means coupled to said voltage converter means and current converter means, for multiplying said first voltage signal by said first current signal to provide a first multiplied signal, for multiplying said second voltage signal by said second current signal to provide a second multiplied signal and for multiplying said third voltage signal by said third current signal to provide a third multiplied signal;
mixer means coupled to said multiplier means, for mixing said first to third multiplied signals to provide a reactive power control signal; and
means coupled to said mixer means and said circulating current generator means, for converting said reactive power signal to said circulating current instruction.

10. A cycloconverter according to claim 7, wherein said control means further includes:
first circuit means for converting said first, second and third phase current instructions into first, second and third current signals, respectively, according to the state of phases of said currents flowing through said output circuit;
second circuit means coupled to said control signal generator means, for changing the phase angle of each of said first to third phase control signals by substantially 90 degrees, and providing first to third unit voltage signals respectively corresponding to said first to third phase control signals, each of said unit voltage signals having a given amplitude;
third circuit means coupled to said first circuit means and second circuit means, for multiplying said first current signal by said first unit voltage signal to provide a first multiplied signal, for multiplying said second current signal by said second unit voltage signal to provide a second multiplied signal and for multiplying said third current signal by said third unit voltage signal to provide a third multiplied signal;
fourth circuit means coupled to said third circuit means, for adding said first to third multiplied signals to provide a first added signal;
fifth circuit means coupled to said second circuit means, for adding said first to third unit voltage signals to provide a second added signal;
sixth circuit means coupled to said fourth circuit means and fifth circuit means, for dividing said first added signal by said second added signal and providing said circulating current instruction.

* * * * *